(12) United States Patent
Li et al.

(10) Patent No.: US 10,225,823 B2
(45) Date of Patent: Mar. 5, 2019

(54) METHOD AND APPARATUS FOR CONTROL SIGNAL TRANSMISSION

(71) Applicant: Telefonaktiebolaget LM Ericsson (publ), Stockholm (SE)

(72) Inventors: Gen Li, Beijing (CN); Jinhua Liu, Beijing (CN); Qingyu Miao, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 15/037,265

(22) PCT Filed: May 11, 2016

(86) PCT No.: PCT/CN2016/081731
§ 371 (c)(1),
(2) Date: May 17, 2016

(87) PCT Pub. No.: WO2017/063359
PCT Pub. Date: Apr. 20, 2017

(65) Prior Publication Data
US 2017/0332362 A1    Nov. 16, 2017

(51) Int. Cl.
*H04W 72/04*    (2009.01)
*H04W 72/12*    (2009.01)
*H04W 74/08*    (2009.01)

(52) U.S. Cl.
CPC ....... *H04W 72/0406* (2013.01); *H04W 72/12* (2013.01); *H04W 74/08* (2013.01)

(58) Field of Classification Search
CPC .. H04W 72/0406; H04W 72/12; H04W 74/08
See application file for complete search history.

(56) References Cited

U.S. PATENT DOCUMENTS

| 9,642,029 B2* | 5/2017 | Weber | H04W 24/10 |
| 2008/0233964 A1* | 9/2008 | McCoy | H04W 72/1284 |
| | | | 455/450 |

(Continued)

FOREIGN PATENT DOCUMENTS

| CN | 105101240 A | 11/2015 |
| CN | 105491641 A | 4/2016 |

(Continued)

OTHER PUBLICATIONS

International Search Report and Written Opinion for Application No. PCT/CN2016/081731, dated Jan. 20, 2017, 9 pages.

(Continued)

*Primary Examiner* — Gbemileke J Onamuti
(74) *Attorney, Agent, or Firm* — Nicholson De Vos Webster & Elliott LLP

(57) ABSTRACT

Embodiments of the present disclosure provide methods, apparatuses and computer program for control signal transmission and reception. A method implemented at a network device comprises: determining a first period and a first plurality of candidate transmission opportunities within the first period, for transmitting a first control signal through a wireless channel; selecting a candidate transmission opportunity from the first plurality of candidate transmission opportunities within the first period; and transmitting the first control signal through the wireless channel to a terminal device using the selected candidate transmission opportunity. By virtue of the method, probability for a successful transmission of the first control signal can be increased.

24 Claims, 8 Drawing Sheets

(56) References Cited

U.S. PATENT DOCUMENTS

| | | | | |
|---|---|---|---|---|
| 2013/0195068 A1* | 8/2013 | Baker | .................. | H04L 5/0023 |
| | | | | 370/330 |
| 2014/0334428 A1* | 11/2014 | Hara | .................... | H04L 1/0001 |
| | | | | 370/329 |
| 2016/0007368 A1 | 1/2016 | Moon et al. | | |

FOREIGN PATENT DOCUMENTS

| | | |
|---|---|---|
| CN | 105531958 A | 4/2016 |
| WO | 2015106698 A1 | 7/2015 |
| WO | 2016049810 A1 | 4/2016 |

OTHER PUBLICATIONS

Extended European Search Report for Application No. 16847597.8, dated Apr. 30, 2018, 8 pages.
NTT Docomo, Inc., "Discussion on issues related to RRM Measurement and Synchronization in LAA," 3GPP TSG RAN WG1 Ad-hoc Meeting, Mar. 24-26, 2015, R1-151096, 7 pages.
International Preliminary Report on Patentability for Application No. PCT/CN2016/081731, dated Aug. 24, 2018, 84 pages.

\* cited by examiner

METHOD AND APPARATUS FOR CONTROL SIGNAL TRANSMISSION

CROSS-REFERENCE TO RELATED APPLICATIONS

This application is a National stage of International Application No. PCT/CN2016/081731, filed May 11, 2016, which is hereby incorporated by reference.

TECHNICAL FIELD

The non-limiting and example embodiments of the present disclosure generally relate to a technical field of wireless communications, and specifically to methods, apparatuses and computer programs for control signal transmission.

BACKGROUND

This section introduces aspects that may facilitate a better understanding of the disclosure. Accordingly, the statements of this section are to be read in this light and are not to be understood as admissions about what is in the prior art or what is not in the prior art.

Motivated by massive growth of device number and traffic volume, a next generation wireless communication network (also referred to as the fifth generation (5G), NX or NR) is being studied. The next generation wireless communication network aims at enabling a truly Networked Society, where information can be accessed and data can be shared anywhere and anytime by anyone and anything. Besides, the next generation wireless communication network will provide an increasingly wide range of applications which may have variable requirements and characteristics. Enterprise solution is an important application case for the 5G radio access technology (RAT), which enables a company, a factory or even a householder to set up a network for serving its private devices.

Unlicensed bands are more feasible for the enterprise solutions, since they are shared bands and allow flexible and independent network deployment. One important requirement for the enterprise solution to succeed is to enable a standalone operation in the unlicensed band without assistance from a licensed band. To satisfy such a requirement, reliable signaling transmission (e.g. synchronization signal, system information, paging, reference signal, and so on) should be guaranteed.

SUMMARY

The unlicensed spectrum (e.g., 5G Hz) is a shared spectrum, and then a signal transmission on a wireless channel from a device may need to be cancelled if the wireless channel is already occupied by another device, in order to avoid significant interference to/from the other device. It means that, in such a case, delivery of the signal has to be delayed. This may result in problems in various aspects, some of which are listed below:

If the signal contains system information which is necessary for a network access of a terminal device, the delay may cause a problem that the terminal device cannot be served in time;

If the signal provides synchronization related information, the delay may cause a problem that a terminal may be un-synchronized with a network and thus lose connection with the network;

If the signal carries a trigger for data transmission or reception, the delay may cause latency for the corresponding data transmission/reception to increase.

In order to solve at least part of the above problems, methods, apparatuses and computer programs are provided in the present disclosure. It can be appreciated that embodiments of the present disclosure are not limited to a wireless system operating in an unlicensed band, but could be more widely applied to any application scenario where similar problem exists.

Various embodiments of the present disclosure mainly aim at providing methods, apparatuses and computer programs for facilitating reference signal transmission in a wireless communication network. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a network device. The method includes: determining a first period and a first plurality of candidate transmission opportunities within the first period, for transmitting a first control signal through a wireless channel; selecting a candidate transmission opportunity from the first plurality of candidate transmission opportunities within the first period; and transmitting the first control signal through the wireless channel to a terminal device using the selected candidate transmission opportunity.

In one embodiment, the first plurality of candidate transmission opportunities may be determined by one of: a transmission time window, which indicates a time interval for a plurality of transmissions of the first control signal, and a plurality of time positions, each of the plurality of time positions indicating a time position for starting a transmission of the first control signal.

In another embodiment, determining the first period and the first plurality of candidate transmission opportunities may include determining the first period and the first plurality of candidate transmission opportunities based on at least one of: a predefined configuration for the first period and the first plurality of candidate transmission opportunities, a type and/or content of the first control signal, a status of the wireless channel, and a quality of service (QoS) requirement of the device.

In some embodiments, the method may further include incorporating an indication into the first control signal before the transmitting, for indicating a time offset of the selected candidate transmission opportunity within the first period. In one embodiment, incorporating the indication into the first control signal may include at least one of: including the indication as a part of a payload of the first control signal; and selecting a transmission configuration from a first set of transmission configurations based on the selected candidate transmission opportunity, wherein each transmission configuration of the first set of transmission configurations is mapped to a candidate transmission opportunity of the first plurality of candidate transmission opportunities.

In one embodiment, the method may further include detecting availability of the wireless channel before transmitting the first control signal; and wherein said selecting a candidate transmission opportunity from the first plurality of candidate transmission opportunities within the first period may include selecting the candidate transmission opportunity based on a result of the detection, such that the wireless channel is available during the selected candidate transmission opportunity. In another embodiment, detecting availability of the wireless channel before transmitting the first control signal may include starting the detection before the first candidate transmission opportunity of the first plurality of candidate transmission opportunities. In an embodiment, a time period from starting the detection to the first candidate transmission opportunity may depend on a probability of the wireless channel being detected as available.

In still another embodiment, the method may further include determining a second period and a second plurality of candidate transmission opportunities within the second period, for transmitting a second control signal through the wireless channel; selecting a further candidate transmission opportunity from the second plurality of candidate transmission opportunities within the second period; and transmitting the second control signal through the wireless channel to the device using the selected further candidate transmission opportunity. In one embodiment, selecting the further candidate transmission opportunity may be based on the selected candidate transmission opportunity for the first control signal.

In a second aspect of the disclosure, there is provided a method implemented in a terminal device. The method includes determining a first period and a first plurality of candidate transmission opportunities within the first period, for receiving a first control signal through the wireless channel; and detecting the first control signal from a network device within the first period according to the determination.

In one embodiment, the first plurality of candidate transmission opportunities may be determined by one of: a transmission time window, which indicates a time interval for a plurality of transmissions of the first control signal, and a plurality of time positions, each of the plurality of time positions indicating a start time position for transmission of the first control signal.

In one embodiment, the method may further include obtaining an indication from the detected first control signal, the indication indicating a time offset of the detected first control signal within the first period.

In another embodiment, the method may further include synchronizing with the network device at least partly based on the obtained indication. In still another embodiment, obtaining an indication from the detected first control signal may include at least one of: extracting the indication from a payload of the first control signal, and obtaining the indication based on a transmission configuration of the detected first control signal.

In a third aspect of the disclosure, there is provided a network device. The network device includes a first determination unit, configured to determine a first period and a first plurality of candidate transmission opportunities within the first period, for transmitting a first control signal through a wireless channel; a first opportunity selection unit, configured to select a candidate transmission opportunity from the first plurality of candidate transmission opportunities within the first period; and a first transmitting unit, configured to transmit the first control signal through the wireless channel to a terminal device using the selected candidate transmission opportunity.

In a fourth aspect of the disclosure, there is provided a terminal device. The terminal device includes a third determination unit, configured to determine a first period and a first plurality of candidate transmission opportunities within the first period, for receiving a first control signal through a wireless channel; and a first detection unit, configured to detect the first control signal from a network device within the first period according to the determination.

In a fifth aspect of the disclosure, there is provided a network device. The network device includes a processor and a memory, said memory containing instructions executable by said processor, and said processor being configured to cause the network device to perform a method according the first aspect of the present disclosure.

In a sixth aspect of the disclosure, there is provided a terminal device. The terminal device includes a processor and a memory, said memory containing instructions executable by said processor and said processor being configured to cause the terminal device to perform a method according the second aspect of the present disclosure.

In a seventh aspect of the disclosure, there is provided a computer program, comprising instructions which, when executed on at least one processor, cause the at least one processor to carry out a method according to the first aspect of the present disclosure.

In an eighth aspect of the disclosure, there is provided a computer program, comprising instructions which, when executed on at least one processor, cause the at least one processor to carry out a method according to the second aspect of the present disclosure.

According to the various aspects and embodiments as mentioned above, control signal transmission can be improved.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
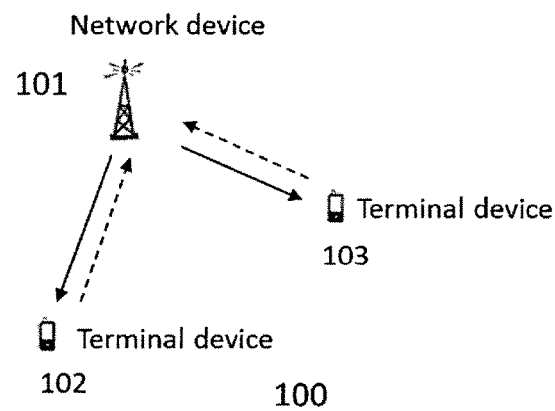
FIG. 1 illustrates an example wireless communication network 100 in which embodiments of the disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as LTE-Advanced (LTE-A), LTE, Wideband Code Division Multiple Access (WCDMA), High-Speed Packet Access (HSPA), and so on. Furthermore, the communications between network devices in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, a terminal device may be a user equipment (UE), which may be a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like.

In the following description, the terms "terminal device", "terminal", "user equipment" and "UE" may be used interchangeably.

FIG. 1 illustrates an example wireless communication network 100 in which embodiments of the disclosure may be implemented. As shown in FIG. 1, the wireless communication network 100 may include one or more network device, for example network device 101, which may be in the form of an eNB. It will be appreciated that the network device 101 could also be in a form of a Node B, BTS (Base Transceiver Station), and/or BSS (Base Station Subsystem), access point (AP) and the like. The network device 101 provides radio connectivity to a plurality of terminal devices for example UEs 102-103 within its coverage. A downlink transmission from the base station to UE may carry data/control signals dedicated to the UE, or common control signals to all or a group of UEs.

As discussed above, to support a standalone wireless system in an unlicensed band, reliable signaling transmission, especially transmission of a common control signal, such as synchronization signal, system information, paging and reference signal, needs to be provided. In the unlicensed band, the reliable signaling transmission may subject to a listen before talk (LBT) constraint.

The key idea of LBT is that a source node (SN) listens to check status of a channel before it actually transmits to a destination node (DN) in the channel. In other words, a default mode of the LBT for the SN is 'not to send', and data is sent by the SN only when the channel is determined as available by listening. Here 'available' means that a planned transmission in this channel will neither interfere nor be interfered by a current ongoing transmission. Herein, "listening" and "listen" may also be referred to as "sensing" or "detecting" or "sense" or "detect" separately. For LBT, it should also be considered that how long a time duration should be used for listening before a transmission. For this purpose, a back-off counter is introduced for LBT. The counter is generated randomly when the SN plans to transmit data, and decreases if the channel is sensed as idle. The SN regards the channel as idle when the counter expires, and may start to transmit data in the channel. One example of LBT operations in a WiFi system is given in FIG. 2.

Figure 2:
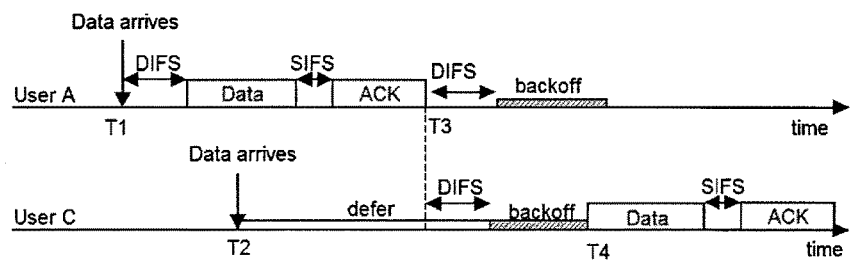
FIG. 2 illustrates an example of a listen before talk procedure in a Wireless Fidelity (WiFi) system.

In this example, user A's data arrives at Time T1, then user A plans to transmit the data and starts sensing the channel. If the channel is idle/available, user A may transmit its data after a distributed coordination function (DCF) interframe space (DIFS) time period. After a time period of short interframe space (SIFS) following its data transmission, user A transmits ACK. As shown in FIG. 2, user C's data arrives at time T2 during user A transmits data. User C senses the channel and finds that the channel is busy, and then it defers its data transmission till user A completes its ACK transmission at time T3. Then both user A and user C sense the channel and find that the channel is idle. They defer their transmission for a time period of DIFS, and after that each of the user A and the user C starts a back-off counter to determine when to start data transmission. In this example, the back-off counter of user C expires earlier than that of user A, and then user C gets a transmission opportunity and starts its transmission at time T4.

Figure 3:
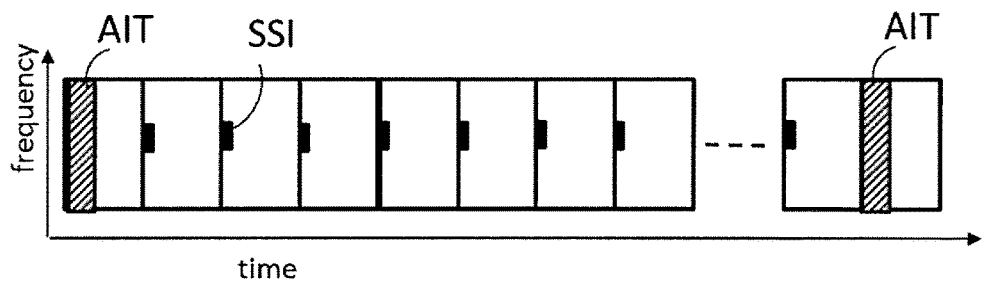
FIG. 3 illustrates conventional transmission of an access information table (AIT) and a system signature sequence index (SSI) signal.

To reduce energy consumption in the network and to fully enable utilizing high gain beam forming or other multi-antenna techniques, a concept has been defined separating the system control plane from the data plane for the next generation wide area networks. The system information can be carried by, for example, a broadcasted access information table (AIT) and system signature sequence index (SSI), as shown in FIG. 3, where the AIT may indicate a plurality of configuration indexes and corresponding configuration associated with each of the plurality of configuration indexes, while the SSI may include an index which can be used to retrieve information from the broadcasted AIT. To reduce network energy consumption, the broadcast signals, such as AIT and/or SSI, are expected to be infrequent compared to current reference signals in cellular systems. For example, the AIT may be typically transmitted with a long periodicity (e.g., from 1.024 s up to 10.24 s). The SSI may be transmitted more often than the AIT, as shown in FIG. 3. For example, the SSI can be transmitted every 100 ms. An AIT would provide initial access related parameters and relevant system information (e.g., similar information as system information block 1 or system information block 2 (SIB1/SIB2) in LTE) for one or more areas. The SSI provides time/frequency synchronization as well as a mapping to a table entry in the AIT. A received SSI is used by the receiver for deriving access information from the table, and the received power of the SSI is used for layer selection and open-loop power control. The received SSI timing may be used for determining the physical random access channel (PRACH) transmission timing window.

Figure 4:
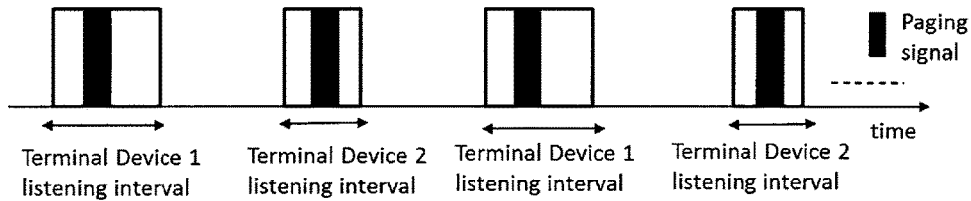
FIG. 4 illustrates an example for paging signal transmission and monitoring.

Besides system information which can be carried by, for example, the AIT and the SSI, a paging signal is another important control signal. If there is downlink data for an idle terminal device, the network device can send a paging signal to wake up the terminal device for data reception. A general principle for paging signaling design is to enable reception with minimal energy consumption at the terminal device side, and achieve resource-efficiency for the network. For example, when possible, a solution for the paging signaling design should make it sufficient for the terminal device to know whether it has been paged by reading a single signal. One example is given in FIG. 4. Different terminal devices could be configured to wake up at different time position to receive the paging signal. The paging signal position for one terminal device may appear periodically, as shown in FIG. 4.

Since unlicensed spectrum (e.g., 5G Hz) is a shared spectrum, then for signal transmission over the unlicensed spectrum, LBT may be required in some areas such as Europe and Japan. This requirement applies to both data transmission and control signal (such as AIT, SSI, paging signal, etc.) transmission. Therefore, when a NX system is operated standalone over the unlicensed spectrum, it means that a control signal (e.g., AIT/SSI/TRA/Paging signal) can be transmitted only when the channel is sensed/detected as idle.

One simple way is to perform channel sensing for certain time period before a predetermined control signal transmission. The problem here lies in that there is a high probability that a control signaling transmission has to be cancelled due to a fact that the channel is detected as unavailable. In such a case, the control signaling transmission has to be delayed. This may result in problems in different aspects, some of which are listed below:

If AIT containing access-related information is not transmitted for a long time period, some UEs may have problem in being served due to failing to get information on access configuration;

If SSI which provides synchronization and access index is not transmitted, UEs may not be synchronized with network and thus lose connection;

If paging signal is not transmitted when DL data transmitted, delay of data transmission would be significantly increased.

Therefore solutions should be provided to ensure/increase a transmission opportunity for control signals (for example, ATI and/or SSI, and/or Paging signal) in the unlicensed band, and it is vital to keep as good a performance for a NX systems as that for a licensed carrier.

In order to solve at least part of the above problems, methods, apparatuses and computer programs have been proposed herein. It should be appreciated that embodiments of the disclosure are not limited to a wireless system operating in an unlicensed band, but could be more widely used to any application scenario where similar problem exists.

Reference is now made to FIGS. 5a-5d, which show flowcharts of a method 500 in a wireless communication network (e.g., the wireless communication network 100 shown in FIG. 1), for communicating with a terminal device (e.g., terminal device 102 or 103 of FIG. 1). In one embodiment, the method 500 may be implemented by a network device, for example the network device 101 as shown in FIG. 1.

Figure 5A:
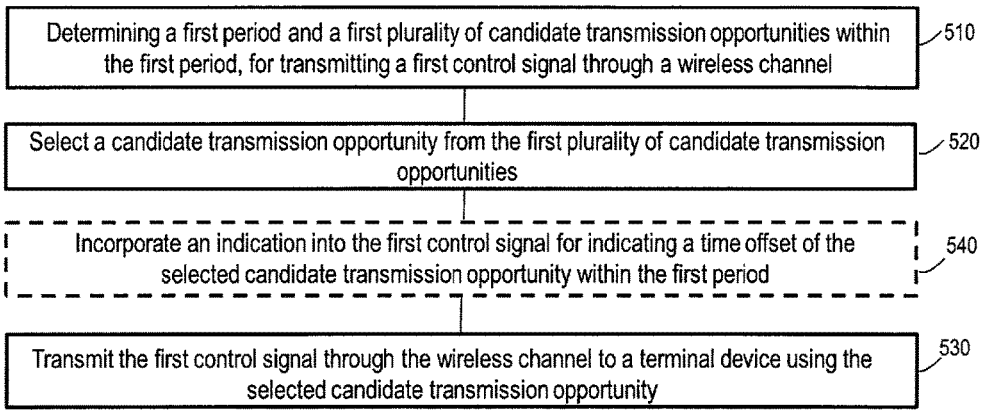
FIGS. 5a-5d illustrate flowcharts of a method implemented at a network device according to an embodiment of the present disclosure.

As illustrated in FIG. 5a, the method 500 includes determining, at block 510, a first period and a first plurality of candidate transmission opportunities within the first period, for transmitting a first control signal through a wireless channel. The first period indicates periodicity for transmitting the first control signal, and each of the first plurality of candidate transmission opportunities refers to a candidate resource for transmitting the first control signal. At block 520, a candidate transmission opportunity is selected from the first plurality of candidate transmission opportunities within the first period. At block 530, the first control signal is transmitted through the wireless channel to the terminal device (e.g., terminal device 102 or 103 shown in FIG. 1) using the selected candidate transmission opportunity.

With the method 500, probability for a control signal transmission to succeed is increased, and correspondingly user experience can be improved.

In one embodiment, the first control signal can be a common control signal, for example an AIT, or a SSI, or other control signal indicating system information which may be used by a group of UEs. In another embodiment, the first control signal may be a control signal targeted for reception by a specific terminal device. For example, it may be a paging signal or any other dedicated signals. It will be appreciated that, in some embodiments, the first control signal may include both common control and dedicated control signals. In a further embodiment, the first control signal can be replaced by user data.

Figure 6A:
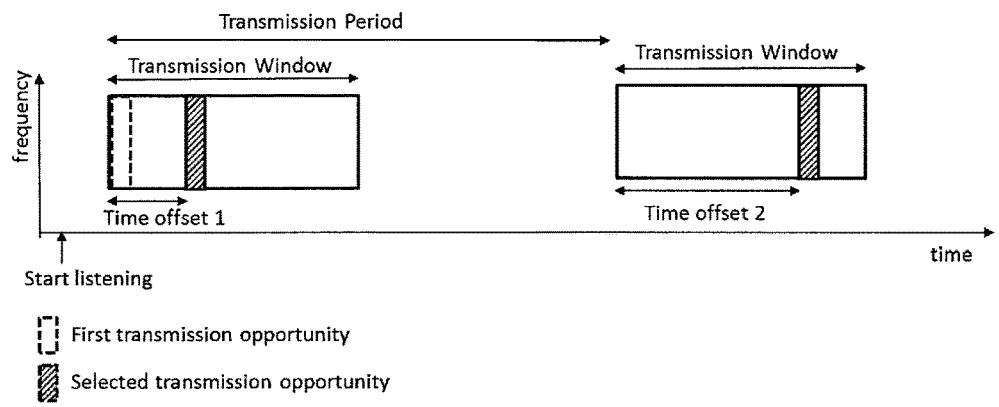
FIG. 6a-6d illustrate examples of transmitting control signals according to embodiments of the present disclosure.

As one alternative, in one embodiment, the first plurality of candidate transmission opportunities determined at block 510 can be provided by a transmission time window. The transmission window indicates a time interval for a plurality of transmissions of the first control signal. That is, a definition for any discrete starting position of a transmission may not be required (but also not excluded) in this embodiment. The transmission of the first control signal may starts at any selected time point within the transmission window and completes within the transmission window. An example is shown in FIG. 6a, where the selected transmission opportunity can occur at any time point of the transmission window with a time offset relative to the starting point of the transmission window.

Figure 6B:
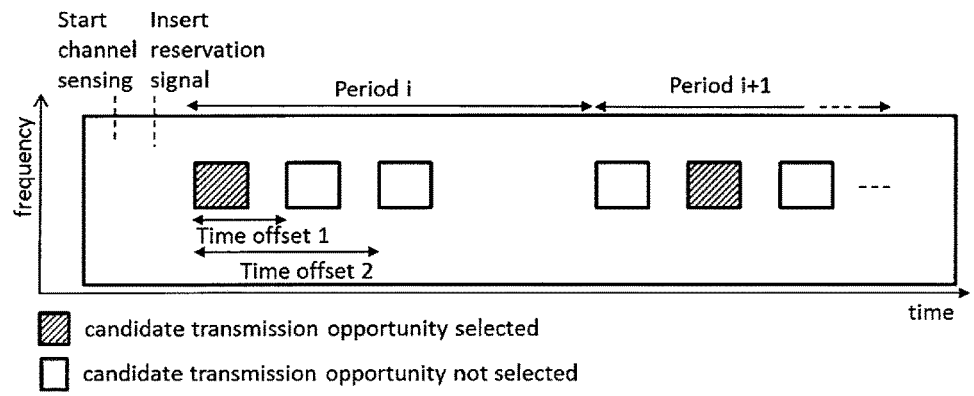

In another embodiment, the first plurality of candidate transmission opportunities can be provided by a plurality of time positions, each of the plurality of time positions indicating a time position for starting the transmission of the first control signal. An example is shown in FIG. 6b where three candidate transmission opportunities are illustrated. In this example, the first candidate transmission opportunity is selected for transmitting the first control signal in the ith period, and in the (i+1)th period, a different second candidate transmission opportunity is selected.

The above embodiments may be implemented in a NX system operating in an unlicensed band, for example, to ensure/increase transmission opportunity of a control signal transmission (e.g., AIT/SSI/Paging signal) or data transmission, over unlicensed spectrum, a plurality of candidate positions in one transmission (TX) period could be configured compared to corresponding predetermined transmission time positions for the NX system in a licensed carrier.

In some embodiments, at block 510, the network device may determine the first period and/or the first plurality of candidate transmission opportunities based on status of the wireless channel, and/or a quality of service (QoS) requirement of the device. For example, if the channel often is busy/crowed, or in other words, probability of a successful transmission is low, the network device may determine to configure more candidate transmission opportunities in the first period. As another example, if the terminal device is delay tolerant, a small number of candidate transmission opportunities may be configured in the first period, since the terminal device may receive the first control signaling in next transmission period if the network device fails to transmit in current period/cycle, and it may not impact the QoS of the terminal device significantly.

Alternatively or additionally, in another embodiment, at block 510, the network device may determine the first period based on a type and/or content of the first control signal. For example, if the first control signal contains information which needs to be updated frequently, the first period (i.e., transmission period of the first control signal) may be determined to be small. These embodiments provide increased configuration flexibility for the transmission of the control signal, and facilitate obtaining a balance between performance and power consumption of a receiver (i.e., a terminal device).

In some embodiments, a configuration for the first period and/or number of candidate transmission opportunities of the first control signal may be predefined, for example, specified in a communication standard, and then at block 510, the network device may determine based on the predefined configuration.

In some other embodiment, the determination at block 510 may be based on both a predefinition and at least one of the factors mentioned above. For example, there can be a predefined set of configurations for the first period and/or the plurality of candidate transmission opportunities, and the network device may determine at block 510 by selecting a suitable configuration to use from the predefined set, based on a QoS requirement, and/or a type and/or content of the first control signal, and/or channel status.

Figure 5B:
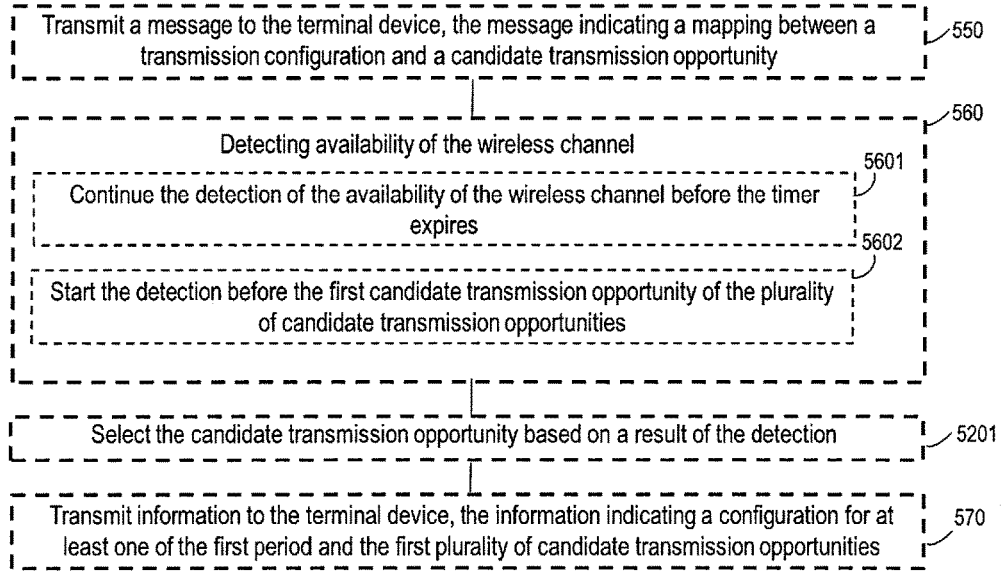

Optionally, as shown in FIG. 5b, the method may include a block 570, where the network device may transmit information indicating a configuration for at least one of the first period and the first plurality of candidate transmission opportunities to a terminal device. It can be appreciated that if the configuration for the first period and/or the first plurality of candidate transmission opportunities is predefined or can be obtained by the terminal device implicitly, the block 570 may be omitted.

In one embodiment, the method 500 may optionally include a block 540, as shown in FIG. 5a. At block 540, the network device may incorporate an indication into the first control signal before the transmitting at block 530. The indication is used for indicating a time offset of the selected candidate transmission opportunity within the first period, for example, a time offset of the selected candidate transmission opportunity relative to a reference time point. The reference time point may be, for example, a starting point of a transmission window, an end point of the transmission window, or any other predetermined time point within the first period.

Figure 5C:
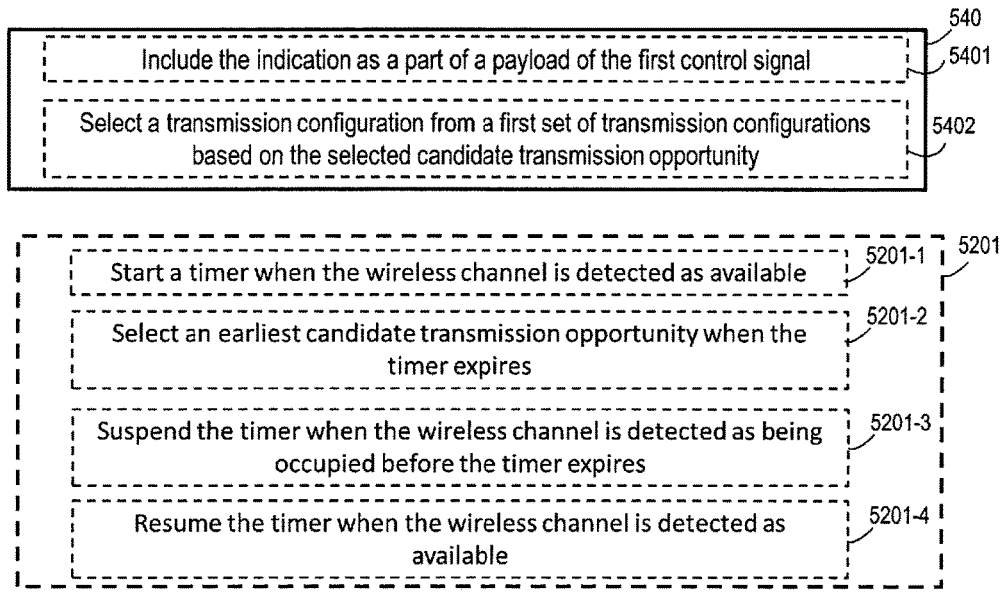

Some example embodiments of the block 540 are illustrated in FIG. 5c. In one embodiment, block 540 may include a sub-block 5401 where the network device may include the indication as a part of a payload of the first control signal. Alternatively or additionally, in another embodiment, the network device may incorporate the indication to the first control signal implicitly. For example, the block 540 may include a sub-block 5402, where the network device may select a transmission configuration from a first set of transmission configurations based on the selected candidate transmission opportunity, wherein each transmission configuration of the first set of transmission configurations is mapped to a candidate transmission opportunity of the first plurality of candidate transmission opportunities. In this way, the selected candidate transmission opportunity and its time offset can be indicated by the selected transmission configuration for the first control signal without additional signaling overhead.

In some embodiments, the transmission configuration may be a configuration for a sequence used by the first control signal, and/or, a cyclic shift of a sequence for the first control signal, and/or, an orthogonal cover code (OCC) to be used for the first control signal. Correspondingly, the first set of transmission configurations may include at least one of the following for transmitting the first control signal: a set of sequences, a set of cyclic shifts of a sequence, and a set of orthogonal cover codes.

A mapping between a transmission configuration for the first control signal and a candidate transmission opportunity of the first plurality of candidate transmission opportunities may be predefined, in one embodiment. In another embodiment, the mapping may be transmitted to the device via a message at block 550, as shown in FIG. 5b. The message may be a physical layer message or a higher layer message, and embodiments of the present disclosure are not limited to any specific message for conveying the indication.

In some embodiments, before transmitting the first control signal at block 530, the network device may detect availability of the wireless channel at block 560. The detection may be performed according to a predefined LBT principle. In one embodiment, block 520 may include a sub-block 5201, where the network device may select the candidate transmission opportunity based on a result of the detection at block 560, such that the wireless channel is available during the selected candidate transmission opportunity, as shown in FIG. 5b. Some examples are illustrated in FIG. 6a-6d.

In an example shown in FIG. 6a, the method 500 may be used for an AIT transmission and one TX window is configured in each transmission period, i.e. the AIT is only allowed to be transmitted within this time window in each period. This transmission window (i.e. maximum offset) may be predefined or indicated to a terminal device via signaling for scanning AIT blindly. The eNB may start LBT before a periodical AIT transmission (e.g. every 10 s). When the LBT succeeds in this TX window, the AIT may be transmitted as early as possible, as shown in FIG. 6a. A time offset of the transmission (e.g., with respect to the starting position of the TX window) may be included in the content of AIT. Besides the time offset, System Frame Number (SFN)/Timing information may also be provided in the AIT content. The SFN/Timing may indicate the time in the granularity of 10 ms in a NX system instead of a 1 ms used in LTE. The AIT transmission offsets may be indicated with a ms-level (less than 10 ms) granularity. Finally, a real AIT transmission time can be obtained at the receiver side based on a combination of SFN/Timing and ms-level time offset.

In another example, the method 500 may be used for a SSI transmission. In a NX system designed for a licensed band, a SSI transmission is periodical signal sequence (e.g. every 100 ms) to provide synchronization. Besides, the sequence is allocated in a pre-defined group of subcarriers, e.g., a small number of possible positions of the working carrier. However, operating a NX system in an unlicensed band may face many challenges. First, a large number of candidate SS sequences are needed to reduce the possibility that SSIs from different un-coordinated network nodes are same. The actual size of SSI bits is for future study. Second, LBT may be performed in the process of SSI transmission. In particular, the eNB may start listening certain time (e.g. 4 subframes) before a periodical SSI transmission. When the randomly generated back-off counter expires, reservation signal may be inserted until SSI transmission starts to avoid other users to jump in. In order to prioritize SSI transmission compared to data transmission, shorter contention window than for data transmission will be used, e.g. maximally Q=8 slots for SS and maximally Q=20 slots for data, where [0, Q] is the range for random back off counter. Since SSI transmission is only located in a small number of possible positions in the carrier, DL data transmission or dummy signals may be transmitted in other subcarriers at the same time, so that other listening devices can regard this carrier as busy (i.e. occupied) by energy sensing. The AIT or other useful system information could be put here as well. It is possible that the LBT fails at the transmission time of SSI, in such a case, the SSI transmission has to be delayed. To alleviate such problem, multiple candidate positions for SSI transmission may be predefined. In the example shown in FIG. 6b, three candidate transmission positions are configured for SSI transmission in a transmission period. If the LBT fails until starting point of the first candidate transmission position, the network device may continue to monitor the channel and seeks opportunity to transmit SSI in the second or third candidate positions. The network device needs to perform channel sensing before each candidate position. If the LBT succeeds prior to the starting point of the first candidate transmission position, as shown in FIG. 6b, the network device may try to transmit the SSI using the first candidate transmission opportunity. Optionally, as shown in FIG. 6b, to avoid the wireless channel being occupied by other users before the SSI transmission, the network device may insert some reservation signals to the wireless channel to prevent the channel from being detected as idle. Further, as described above, depending on the selected candidate transmission opportunity, the network device may use a corresponding sequence for the SSI transmission, thereby indicating a time offset of the SSI transmission with respect to a reference time position. That is, one sequence set may be predefined and the sequences are mapped to the candidate transmission positions according to predefined rules. Such predefined mapping relationships help the terminal device to derive the radio frame/subframe timing in practice. Alternatively, a same SS sequence with different cyclic shifts (CS) may be used for different candidate transmission positions. Likewise, the cyclic shift to candidate position mapping may be predefined. As another option, a same SS sequence with different orthogonal cover codes (OCC) may be used for different candidate transmission positions. The orthogonal codes to candidate position mapping may be predefined. In some embodiments, these mapping may be indicated to UEs via a signaling, as described with reference to block 550.

Figure 6C:
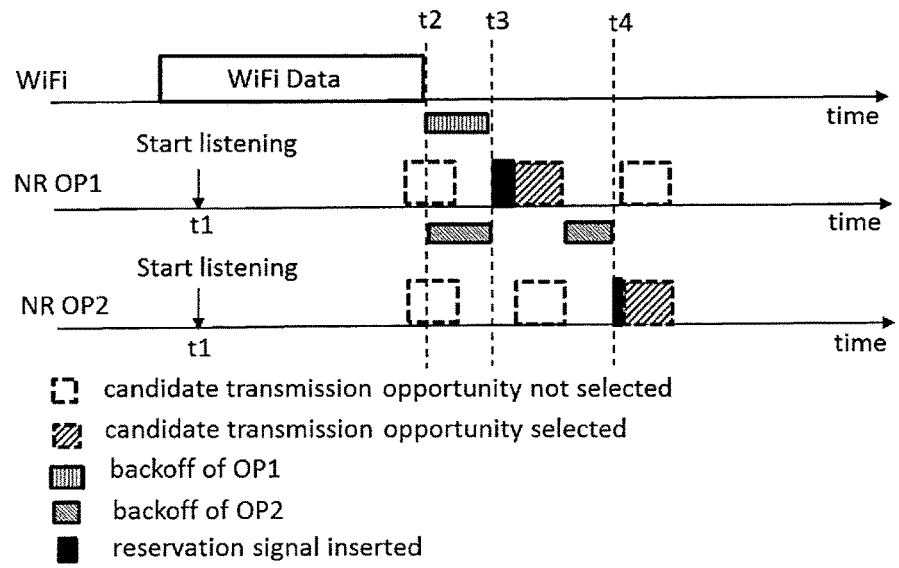

FIG. 6c provides another example, where a NX operator 1 (denoted as OP1 in FIG. 6c) and a NX operator 2 (denoted as OP2 in FIG. 6c) have different back-off counters. Both the OP1 and the OP2 start listening (also referred to as sensing or detecting) the channel at time t1, and they both detected at time t2 that the channel is idle. When the OP1's back-off counter expires, it will transmit. In this example, OP1 starts to transmit the reservation signals at time t3 and then transmit the SSI at the second transmission opportunity. The OP2 considers this channel as busy and stops back-off at t3. When SSI transmission of OP1 ends, OP2 resumes its counter to finish the rest back-off time at t4 and then transmits the SSI using the third candidate transmission opportunity. In this example, thanks to the multiple candidate transmission opportunities, both the OP1 and the OP2 find a chance for the SSI transmission in a transmission period.

Figure 6D:
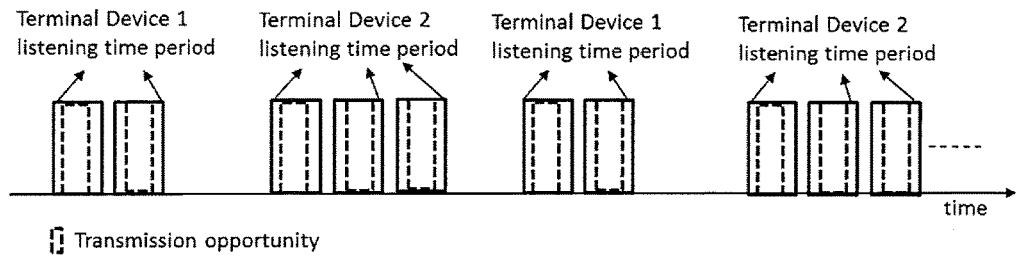

In still another example, the method 500 may be applied to a paging signal transmission, as shown in FIG. 6d. A network device could configure multiple time positions for paging signal transmission. For example, the network device may configure multiple (two for terminal device 1 and three for terminal device 2 in this example) adjacent time durations (e.g. frames) for one terminal device's paging signal monitoring in one period as shown in FIG. 6d. The number of candidate time positions may be terminal device-specific, e.g., a delay-tolerant terminal device could be configured with a smaller number of candidate positions since it may receive paging in next transmission period when paging transmission fails in current transmission period, without impacting its QoS much, while a delay-sensitive terminal devices would be configured with more candidate positions to reduce data transmission latency. The network device may start LBT before a paging transmission period for an intended terminal device and transmit paging signal in one of the multiple candidate positions when it succeeds.

Embodiments of the present disclosure are not limited to any specific algorithm/rules for selecting a candidate transmission opportunity, and any specific operation performed at block 520 for this purpose. Just for illustrative purpose, in FIG. 5c, some example operations that may be performed at the sub-block 5201 are provided. For example, the network device may start a timer at a sub-block 5201-1 when the wireless channel is detected as available, and then select an earliest candidate transmission opportunity when the timer expires at a sub-block 5202.

In another embodiment, block 5201 may include a sub-block 5201-3 and another sub-block 5201-4. At 5201-3, the network device may suspend the timer when the wireless channel is detected as being occupied before the timer expires; and at block 5201-4, the network device resumes the timer when the wireless channel is detected as available again. One example can be found in FIG. 6c, where the OP2 suspends its counter when the OP1 starts its transmission at t3 and resumes its counter when the OP1 completes its transmission.

In one embodiment, the detection performed at block 560 may continue before the timer expires, as shown in FIG. 5b as a sub-block 5601. Alternatively or additionally, in another embodiment, at block 560, the network device may start the detection before the first candidate transmission opportunity of the plurality of candidate transmission opportunities in the first period, as shown in FIG. 5b as a sub-block 5602. Examples of such a detection operation are also illustrated in FIG. 6b-6c.

In a further embodiment, a time period from starting the detection (or, in other words, starts the listening or channel sensing) to the first candidate transmission opportunity, i.e., a time gap between the starting of the detection and the first candidate opportunity, may depend on a probability of the wireless channel being detected as available. In one embodiment, the time period (or, time gap) may be configured by the network device adaptively according to a probability for failing to obtain a transmission opportunity in the channel, or a probability for obtaining a transmission opportunity in the channel successfully. For example, the time period may be configured longer when in last transmission period, the network device fails to transmit the AIT successfully. In this way, the network device may sense the channel more efficiently, and amount of reservation signals to be inserted (e.g., the reservation signal shown in FIG. 6c) before transmitting the first control signal can be kept at a reasonable level.

Figure 5D:
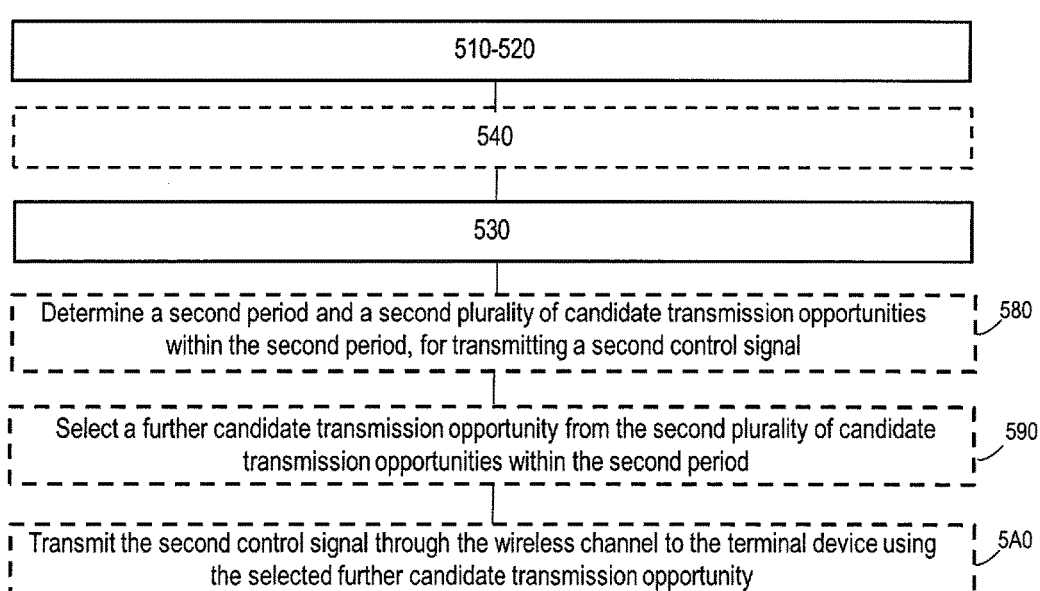

The principle of providing a plurality candidate transmission opportunities for selection in a transmission period to increase probability of successful transmission may be applied to transmission of a plurality of control signals. For example, in one embodiment, the method may further include blocks 580, 590 and 5A0, as shown in FIG. 5d. At block 580, the network device may determine a second period and a second plurality of candidate transmission opportunities within the second period, for transmitting a second control signal through the wireless channel. At block 590, the network device may select a further candidate transmission opportunity from the second plurality of candidate transmission opportunities within the second period. At block 5A0, the network device may transmit the second control signal through the wireless channel to the terminal device using the selected further candidate transmission opportunity. In one embodiment, the first control signal may be an AIT, and the second control signal may be a SSI, or vice versa. In another embodiment, the second control signal may be a paging signal. In other embodiments, the second control signal can be any suitable control signal.

In an embodiment where both a first control signal and a second control signal are provided a plurality of candidate transmission opportunities, at block 590, the network device may select the further candidate transmission opportunity for the second control signal based on the selected candidate transmission opportunity for the first control signal. For example, the candidate transmission opportunities (e.g., candidate transmission positions, and/or a transmission window) for AIT transmission may be predefined with respect to the candidate positions of the SSI transmissions. The SSI and the AIT can either be transmitted in parallel or sequentially. In this embodiment, the network device may not perform LBT for SSI and AIT transmissions separately. Instead, when the LBT for a SSI transmission succeeds, the network device may start transmitting the AIT and the SSI simultaneously, e.g., by using different frequency or code resource. Alternatively, when the LBT for a SSI transmission succeeds, the network device may start transmitting one of the AIT and the SSI, and transmits the other after completing transmission of the one of the AIT and the SSI. It should be appreciated that since the AIT transmission cycle may be larger than the SSI TX cycle, the two control signals may not always be transmitted together, for example, there may be no AIT transmission in some SSI transmission cycles. In this embodiment, detection at the terminal device side can be simplified.

Alternatively or additionally, in another embodiment, the first control signal transmitted at block 530 may include configuration information for transmitting the second control signal. For example, the first control signal may include information indicating at least one of the following: a mapping between a transmission configuration for the second control signal and a candidate transmission opportunity of the second plurality of candidate transmission opportunities, configuration for the second period, and configuration for the second plurality of candidate transmission opportunities. This embodiment allows the network device to configure the transmission of the second control signal adaptively. For example, when it is determined that the wireless channel is less crowded, the number of candidate position could be configured smaller via the first control signal. It can be appreciated that the configuration for the second control signal can also be predefined, for example, hard coded in standardization.

Figure 7A:
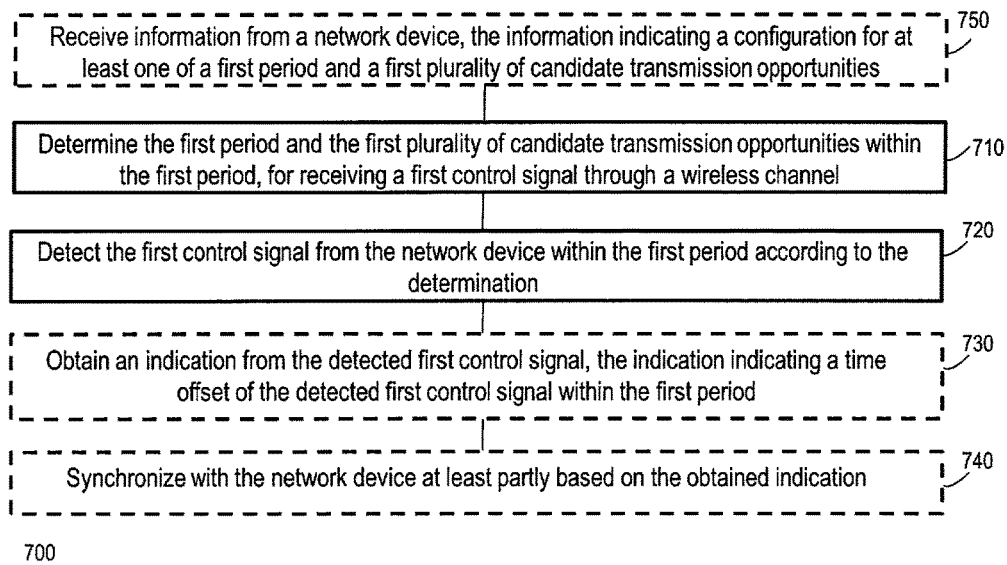
FIGS. 7a-7c illustrate flowcharts of a method implemented at a terminal device according to an embodiment of the present disclosure.
Figure 7B:
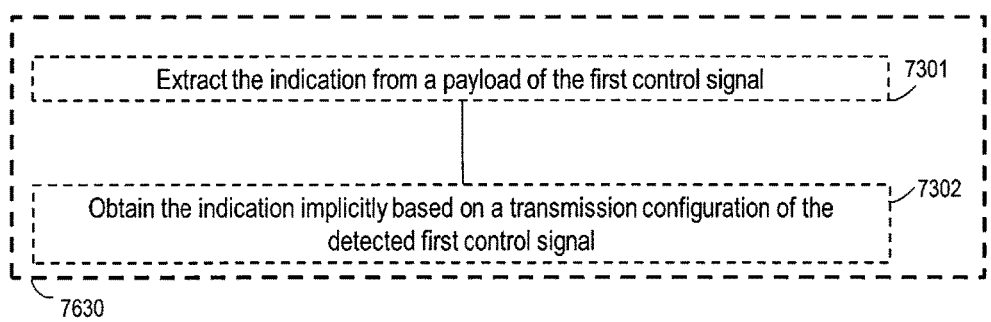
Figure 7C:
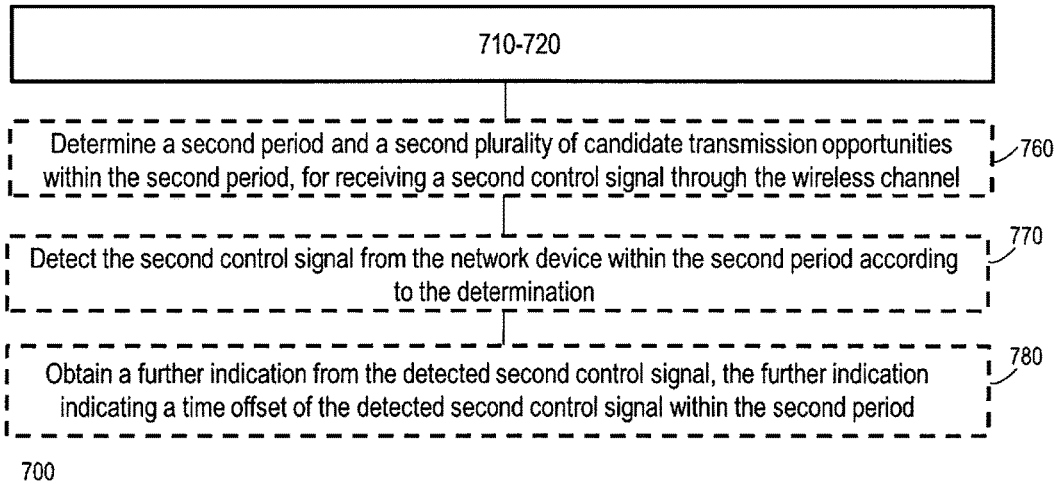

Reference is now made to FIGS. 7a-7c, which show flowcharts of a method 700 implemented at a terminal device (e.g., terminal device 102 or 103 of FIG. 1) for receiving a first control signal through a wireless channel in a wireless communication network (e.g., the wireless communication network 100 shown in FIG. 1).

As illustrated in FIG. 7a, the method 700 includes determining, at block 710, a first period and a first plurality of candidate transmission opportunities within the first period, for receiving the first control signal through the wireless channel; and detecting, at block 720, the first control signal from a network device within the first period according to the determination. In some embodiments, detecting the first control signal may include receiving the first control signal and processing the received first control signal. It can be appreciated that the processing may include, but not limited to, demodulating and/or de-correlating, and the processing operation may vary depending on the technique used at the transmitter side (i.e., the network device).

With the method 700, a plurality of candidate transmission opportunities are provided for transmitting the first control signal, and therefore probability for a successful transmission of the first control signal is increased.

In one embodiment, the first control signal detected by the terminal device at block 720 may be transmitted by a network device at block 530 according to method 500. Therefore, descriptions with respect to the first control signal provided with reference to method 500 also apply here and details will not be repeated. For example, the first control signal may include at least one of an AIT, a SSI, and a paging signal. The first control signal may include additional or different signal in another embodiment, for example, it may include a Track Area Signal (TRAS).

Likewise, descriptions with respect to the first period and the first plurality of candidate transmission opportunities provided with reference to method 500 may also apply here. For example, the first plurality of candidate transmission opportunities may be provided by a transmission time window, which indicates a time interval for a plurality of transmissions of the first control signal, or a plurality of time positions, each of the plurality of time positions indicating a start time position for transmission of the first control signal.

In one embodiment, the configuration for the first period and the first plurality of candidate transmission opportunities may be signaled to the terminal device, and in another embodiment, at least part of the configuration may be predefined or known by the terminal device implicitly. Then in some embodiments, at block 710, the terminal device may determine the first period and the first plurality of candidate transmission opportunities based on at least one of: a message from the network device and a predefined configuration. The message may be transmitted by the network device at block 570 according to method 500, and may be received by the terminal device, at block 750. The message includes information indicating a configuration for at least one of the first period and the first plurality of candidate transmission opportunities.

In an embodiment, as shown in FIG. 7a, the method 700 may further include obtaining, at block 730, an indication from the detected first control signal and the indication indicates a time offset of the detected first control signal within the first period. FIG. 7b provides some examples for the operations performed at block 730. In one example, the indication of the time offset may be included as part of a payload of the first control signal, and in this example, the block 730 may include a sub-block 7301, where the terminal device extracts the indication from the payload of the first control signal. In another embodiment, alternatively or additionally, the indication may be provided implicitly by the transmission configuration of the first control signal, and in this embodiment, the terminal device may obtain the indication at block 7302 implicitly based on a transmission configuration of the detected first control signal. The transmission configuration may include at least one of the following for the detected first control signal: a sequence, a cyclic shift (CS) of a sequence, and an orthogonal cover code (OCC). That is, at block 7302, the terminal device may obtain the indication of the time offset based on a sequence/cyclic shift/OCC or a combination thereof used by the detected first control signal. It should be appreciated that in other embodiments, the terminal device may obtain the indication implicitly based on other factors.

In another embodiment, the time offset (or, the transmission position of the first control signal) may be used by the terminal device for synchronization, and in this embodiment, the method 700 may further include synchronizing with the network device, at block 740, at least partly based on the obtained indication. In still another embodiment, the synchronization may be performed based on both the indication and other information contained in the first control signal or another control signal.

In some embodiment, the terminal device may also receive a second control signal which is transmitted by the network device in a similar way as that of the first control signal. Then in some embodiments, as shown in FIG. 7c, the method 700 may further include determining, at block 760, a second period and a second plurality of candidate transmission opportunities within the second period, for receiving a second control signal through the wireless channel; and detecting at block 770 the second control signal from the network device within the second period according to the determination.

In one embodiment, the network device may transmit the first control signal and the second control signal simultaneously or sequentially. That is, the transmission time position for the second control signal may be related to that for the first control signal, and in this embodiment, the terminal device may detect the second control signal at block 760 at least partly based on a time position where the first control signal is detected.

In another embodiment, the first control signal detected at block 720 may include configuration information for the second control signal. For example, the first control signal may include information indicating at least one of: a mapping between a transmission configuration for the second control signal and a candidate transmission opportunity of the second plurality of candidate transmission opportunities, configuration for the second period, and configuration for the second plurality of candidate transmission opportunities.

Figure 8:
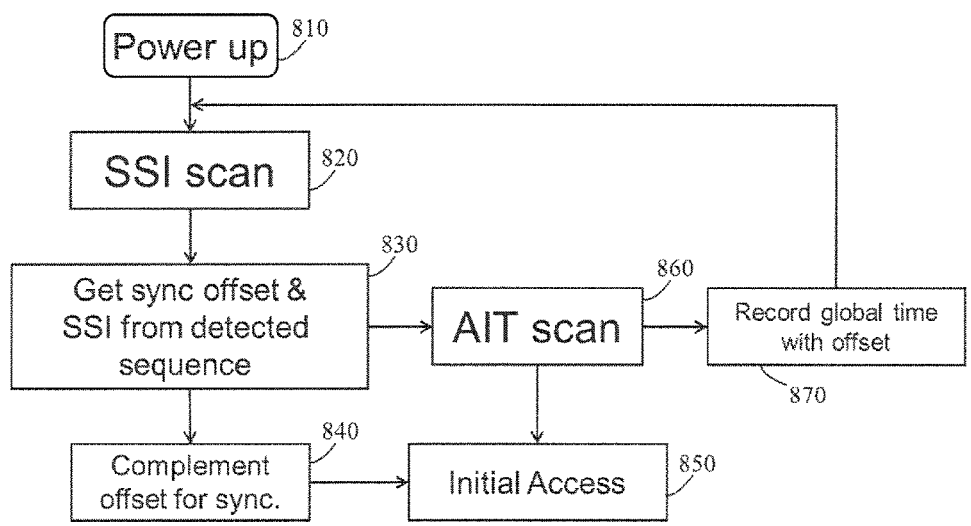
FIG. 8 illustrate flowcharts of a method implemented at a terminal device according to another embodiment of the present disclosure.

In still another embodiment, the detection for the second control signal at block 770 may be triggered by content of the detected first control signal. An example is shown in FIG. 8 which illustrates a procedure for the first and second control signal detection. In this example, the first control signal is a SSI signal and the second control signal is an AIT signal. Both the SSI and the AIT are transmitted periodically, and the period of the AIT may be longer than that of the SSI. That is, the SSI may be transmitted more frequently than the AIT. The terminal device searches for the SSI and the AIT to update system information needed for initial access. After power up at block 810, a terminal device scans the SSI at block 820 first to determine which node can be accessed. From the SSI detection, the terminal device can get time offset of the SSI transmission at block 830, which can be used for synchronization complementation at block 840, by adjusting SSI transmission time offset indicated, for example, by the SS sequence ID/CS/OCC. The synchronization information can be used by the terminal device at block 850 for an initial access. In one example, at block 830, the terminal device may determine whether a local AIT (i.e., an AIT previously detected and stored locally at the terminal device) has needed information corresponding to the detected SSI content, and if not, it may trigger the terminal device to scan the AIT at block 860, for example, by detecting a self-contained sequence in the AIT. The real global time can be calculated based on the detected AIT, for example, by adding global time field contained in the AIT and time offset, for further use. The terminal device may record the updated global time at block 870. By referring to terminal device access procedure in licensed spectrum, the terminal device access procedure may be updated with the offset indication for a shared spectrum. The key difference with licensed operation is that synchronization offset should be obtained from the SSI detection and thus synchronization for further processing may be obtained by complementing the detected offset. Besides, an accurate global time from AIT detection may be obtained by considering AIT offset field as well, which may be used for next SSI scanning.

If an SS/AIT is detected in a candidate position within a transmission period (or, transmission cycle), the terminal device may not monitor the other candidate positions within the same SS/AIT transmission period.

As described with reference to FIG. 8, and as shown in FIG. 7c, in some embodiments, the method 700 may further include obtaining, at 780, a further indication from the detected second control signal, the further indication indicating a time offset of the detected second control signal within the second period. It should be appreciated that, the block 780 is not needed if the second control signal is not used for synchronization.

Figure 9:
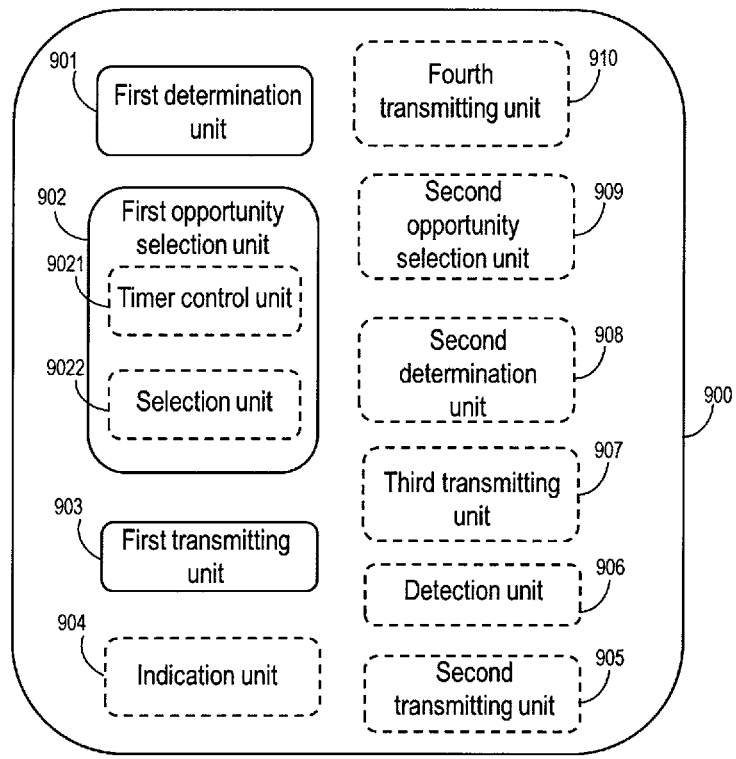
FIG. 9 illustrates a schematic block diagram of an apparatus 900 implemented as/in a network device according to an embodiment of the present disclosure.

Reference is now made to FIG. 9, which illustrates a schematic block diagram of an apparatus 900 in a wireless communication network (e.g., the wireless communication network 100 shown in FIG. 1) for communicating with a terminal device (e.g., terminal device 102 or 103 shown in FIG. 1). The apparatus may be implemented as/in a network device, e.g., the network device 101 shown in FIG. 1. The apparatus 900 is operable to carry out the example method 500 described with reference to FIGS. 5a-5d and possibly any other processes or methods. It is also to be understood that the method 500 is not necessarily carried out by the apparatus 900. At least some steps of the method 500 can be performed by one or more other entities.

As illustrated in FIG. 9, the apparatus 900 includes a first determination unit 901, configured to determine a first period and a first plurality of candidate transmission opportunities within the first period, for transmitting the first control signal through the wireless channel; a first opportunity selection unit 902, configured to select a candidate transmission opportunity from the first plurality of candidate transmission opportunities within the first period; and a first transmitting unit 903, configured to transmit the first control signal through the wireless channel to a device (e.g., terminal device 102 or 103 shown in FIG. 1) using the selected candidate transmission opportunity.

In one embodiment, units 901, 902 and 903 can be configured to perform the operations of blocks 510, 520 and 530 of method 500, respectively, and therefore, descriptions with respect to blocks 510, 520 and 530 provided with reference to method 500 and FIGS. 5a-5d also apply here and details will not be repeated. Likewise, descriptions with respect to the first control signal, the first period and the first plurality of candidate transmission opportunities provided with reference to method 500 may also apply here in some embodiments, and therefore details will not be repeated. For example, the first control signal may include at least one of an AIT, a SSI and a paging signal. In another embodiment, the first plurality of candidate transmission opportunities may be provided by one of: a transmission time window, which indicates a time interval for a plurality of transmissions of the first control signal; and a plurality of time positions, each of the plurality of time positions indicating a start time position for transmission of the first control signal.

Similar as that described with reference to block 510 of method 500, the first determination unit 901 may be configured to determine the first period and/or the first plurality of candidate transmission opportunities based on at least one of: a predefined configuration for the first period and the first plurality of candidate transmission opportunities, type and/or content of the first control signal, status of the wireless channel, and a QoS requirement of the device.

In another embodiment, the apparatus 900 may optionally further include an indication unit 904, configured to incorporate an indication into the first control signal for indicating a time offset of the selected candidate transmission opportunity within the first period. In one embodiment, the indication unit 904 may be configured to incorporate the indication into the first control signal by at least one of: including the indication as a part of a payload of the first control signal; and selecting a transmission configuration from a first set of transmission configurations based on the selected candidate transmission opportunity, wherein each transmission configuration of the first set of transmission configurations is mapped to a candidate transmission opportunity of the first plurality of candidate transmission opportunities. In some embodiments, the first set of transmission configurations may include at least one of the following for transmitting the control signal: a set of sequences, a set of cyclic shifts of a sequence, and a set of orthogonal cover codes. That is, in some embodiments, the indication unit 904 may indicate the time offset of the selected candidate transmission opportunity to the terminal device implicitly by using a corresponding sequence/cyclic shift/OCC for transmitting the first control signal.

In one embodiment, to facilitate the terminal device obtaining the time offset based on the transmission configuration of the first control signal, the network device may include a second transmitting unit 905, configured to transmit a message to the terminal device, the message indicating a mapping between a transmission configuration for the first control signal and a candidate transmission opportunity of the second plurality of candidate transmission opportunities.

In another embodiment, the apparatus 900 may further include a detection unit 906, configured to detect availability of the wireless channel before the first control signal is transmitted by the first transmitting unit 903. In still another embodiment, the first opportunity selection unit 902 may be configured to select the candidate transmission opportunity from the first plurality of candidate transmission opportunities based on a result of the detection of the wireless channel made by the detection unit 906, such that the wireless channel is available during the selected candidate transmission opportunity.

In some embodiments, the first opportunity selection unit 902 includes a timer control unit 9021 and a selection unit 9022. The timer control unit 9021 may be configured to start a timer when the wireless channel is detected as available, and a selection unit 9022 may be configured to select an earliest candidate transmission opportunity when the timer expires. Examples for the operations of 9021 and 9022 can be found in FIG. 6b.

In one embodiment, the detection unit 906 may be configured to continue the detection of the availability of the wireless channel before the timer expires. In another embodiment, the timer control unit 9021 may be configured to suspend the timer when the wireless channel is detected as being occupied before the timer expires and to resume the timer when the wireless channel is detected as available. An example for such operation can also be found in FIG. 6c.

In another embodiment, the detection unit 906 may be configured to start the detection before the first candidate transmission opportunity of the plurality of candidate transmission opportunities. In one embodiment, the first candidate transmission opportunity of the plurality of candidate transmission opportunities may be configured to occur at a time position where a conventional transmission of a control signal is scheduled. For example, in one embodiment, the first candidate transmission opportunity for an AIT may coincide with a conventional predetermined transmission of an AIT as shown in FIG. 3.

In one embodiment, a time period (or time gap) from starting the detection to the first candidate transmission opportunity depends on a probability of the wireless channel being detected as available. That is, the time period may be configured adaptively according to a probability for failing to obtain a transmission opportunity in the channel, or a probability for obtaining a transmission opportunity in the channel successfully. For example, the time period may be configured to be longer when AIT transmission failed in last transmission period/cycle.

In some embodiments, the apparatus 900 may further include a third transmitting unit 907, configured to transmit information to the terminal device, the information indicating a configuration for at least one of the first period and the first plurality of candidate transmission opportunities. It should be appreciated that in some other embodiments, the configuration for the first period and the first plurality of candidate transmission opportunities may be predefined, and in these embodiments, no signaling is needed for this purpose and the third transmitting unit 907 can be omitted.

In a further embodiment, the apparatus 900 may include a second determination unit 908, configured to determine a second period and a second plurality of candidate transmission opportunities within the second period, for transmitting a second control signal through the wireless channel; a second opportunity selection unit 909, configured to select (590) a further candidate transmission opportunity from the second plurality of candidate transmission opportunities within the second period; and a fourth transmitting unit 910, configured to transmit (5A0) the second control signal through the wireless channel to the terminal device using the selected further candidate transmission opportunity.

These units 908-910 enable the network device to increase probability of a successful transmission of the second control signal. In some embodiments, the transmission time for the first control signal and the second control signal may be related, and in these embodiments, the second opportunity selection unit 909 may be configured to select the further candidate transmission opportunity for the second control signal based on the selected candidate transmission opportunity for the first control signal.

In one embodiment, the first control signal may include information indicating configuration(s) for the second control signal. For example, the first control signal may include information indicating at least one of: a mapping between a transmission configuration for the second control signal and a candidate transmission opportunity of the second plurality of candidate transmission opportunities, configuration for the second period, and configuration for the second plurality of candidate transmission opportunities.

In some embodiments, the units 901 to 910 can be configured to perform the operations of block 510 to 5A0 of method 500, respectively, and therefore, descriptions provided with reference to method 500 and FIGS. 5a-5d also apply here.

Figure 10:
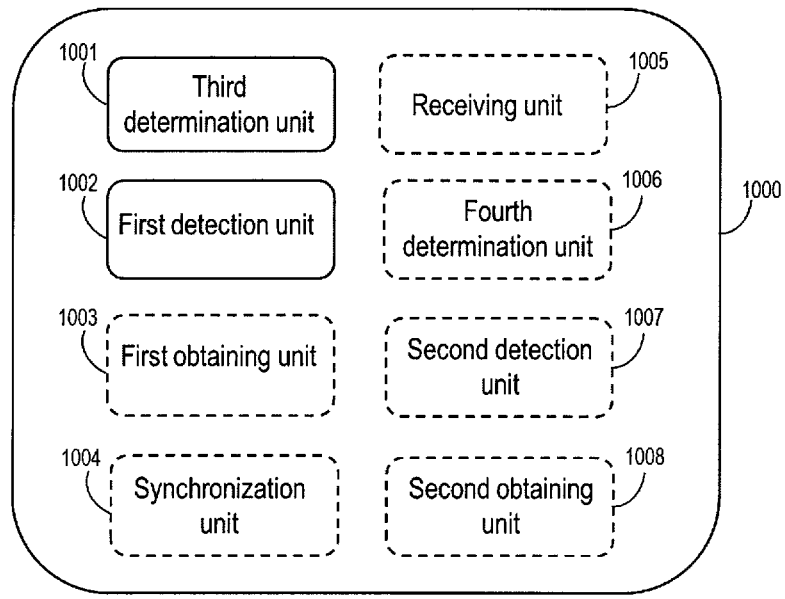
FIG. 10 illustrates a schematic block diagram of an apparatus 1000 implemented as/in a terminal device according to an embodiment of the present disclosure.

FIG. 10 illustrates a schematic block diagram of an apparatus 1000. The apparatus 1000 may be implemented as/in a terminal device, for example the terminal device 102 or 103 shown in FIG. 1. The apparatus 1000 may be operable to carry out the example method 700 described with reference to FIGS. 7a-7c and possibly any other processes or methods. It is to be understood that the method 700 is not necessarily carried out by the apparatus 1000. At least some steps of the method 700 may be performed by one or more other entities.

Particularly, as illustrated in FIG. 10, the apparatus 1000 includes a third determination unit 1001, configured to determine a first period and a first plurality of candidate transmission opportunities within the first period, for receiving the first control signal through the wireless channel; and a first detection unit 1002, configured to detect the first control signal from a network device (e.g., network device 101 shown in FIG. 1)) within the first period according to the determination. In some embodiments, detecting the first control signal may include receiving the first control signal and processing the received first control signal. It can be appreciated that the processing may include, but not limited to, demodulating and/or de-correlating, and the processing operation may vary depending on the technique used at the transmitter side (i.e., the network device).

In some embodiments, the apparatus 1000 may be operable to carry out the example method 700 described with reference to FIGS. 7a-7c, and therefore, descriptions with respect to the first control signal, the first period, and the first plurality of candidate transmission opportunities provided with reference to method 700 also apply here. For example, the first plurality of candidate transmission opportunities may be provided by one of: a transmission time window, which indicates a time interval for a plurality of transmissions of the first control signal, and a plurality of time positions, each of the plurality of time positions indicating a start time position for transmission of the first control signal.

In one embodiment, the first detection unit 1002 may be configured to determine the first period and the first plurality of candidate transmission opportunities based on at least one of: a message from the network device, and a predefined configuration.

In another embodiment, the apparatus 1000 may further include a first obtaining unit 1003, configured to obtain an indication from the detected first control signal, the indication indicating a time offset of the detected first control signal within the first period. For example, the first obtaining unit 1003 may be configured to obtain the indication by extracting the indication from a payload of the first control signal directly, and/or obtain the indication implicitly based on a transmission configuration of the detected first control signal, wherein the transmission configuration is mapped to a candidate transmission opportunity of the first plurality of candidate transmission opportunities. In some embodiments, the transmission configuration includes at least one of a sequence, a cyclic shift of a sequence, and an OCC used by the detected first control signal. It should be appreciated that other transmission configurations which may be used for implicitly indicating the time offset are not excluded.

In some embodiments, the apparatus 1000 may further include a synchronization unit 1004, configured to synchronize with the network device at least partly based on the obtained indication. For example, the synchronization unit 1004 may be configured to get an accurate global timing based on the time offset indicated by the indication and other information contained in the first control signal or another control signal.

Optionally, in one embodiment, the apparatus 1000 may include a receiving unit 1005, configured to receive information from the network device, the information indicating a configuration for at least one of the first period and the first plurality of candidate transmission opportunities. It should be appreciated that in another embodiment where the configuration for the first period and the first plurality of candidate transmission opportunities may be predefined or may be obtained by the terminal device implicitly and therefore the receiving unit 1005 may be omitted from the apparatus 1000.

As shown in FIG. 10, the apparatus 1000 may optionally include a fourth determination unit 1006, configured to determine a second period and a second plurality of candidate transmission opportunities within the second period, for receiving a second control signal through the wireless channel, and a second detection unit 1007, configured to detect (770) the second control signal from the network device within the second period according to the determination.

In some embodiments, the detection unit 1007 may be configured to detect the second control signal at least partly based on a time position where the first control signal is detected.

In one embodiment, the first control signal may include information indicating configuration for the second control signal. For example, the first control signal may include information indicating at least one of: a mapping between a transmission configuration for the second control signal and a candidate transmission opportunity of the second plurality of candidate transmission opportunities, configuration for the second period, and configuration for the second plurality of candidate transmission opportunities.

In another embodiment, the detection by the second detection unit 1007 may be triggered by content of the detected first control signal. For example, the first control signal and the second control signal may be transmitted periodically, and if the terminal device finds based on the content of the first control signal that information of the second control signal recorded at the terminal device side is not the latest, the second detection unit 1007 may be triggered to detect the second control signal again. An example for this is provided in FIG. 8.

In a further embodiment, the apparatus 1000 may further include a second obtaining unit 1008, configured to obtain a further indication from the detected second control signal, the further indication indicating a time offset of the detected second control signal within the second period.

Figure 11:
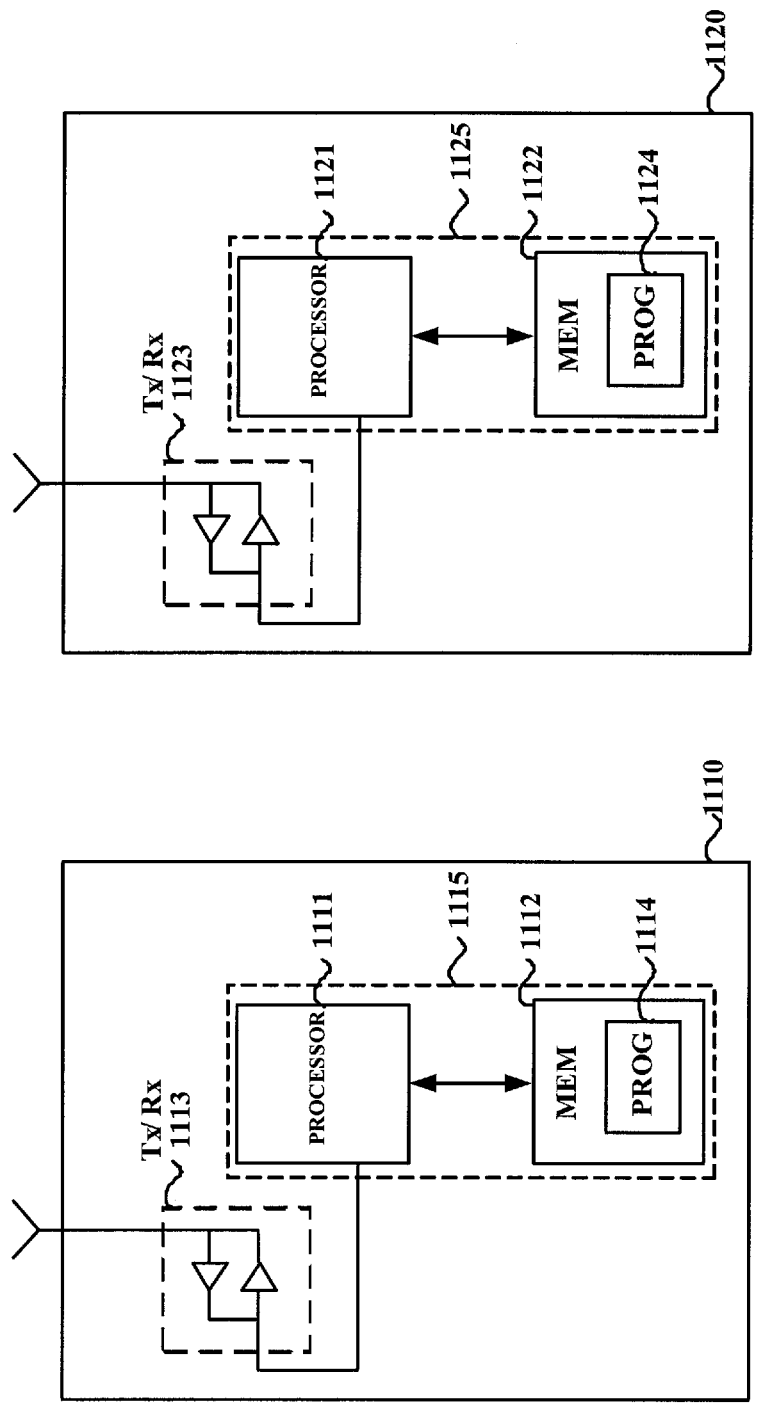
FIG. 11 illustrates a simplified block diagram of an apparatus 1110 that may be embodied as/in a network device, and an apparatus 1120 that may be embodied as/in a terminal device.

FIG. 11 illustrates a simplified block diagram of an apparatus 1110 that may be embodied in/as a network device, e.g., the network device 101 shown in FIG. 1, and an apparatus 1120 that may be embodied in/as a terminal device, e.g., one of the terminal devices 102 and 103 shown in FIG. 1.

The apparatus 1110 may include at least one processor 1111, such as a data processor (DP) and at least one memory (MEM) 1112 coupled to the processor 1111. The apparatus 1110 may further include a transmitter TX and receiver RX 1113 coupled to the processor 1111. The MEM 1112 may be non-transitory machine readable storage medium and it may store a program (PROG) 1114. The PROG 1114 may include instructions that, when executed on the associated processor 1111, enable the apparatus 1110 to operate in accordance with the embodiments of the present disclosure, for example to perform the method 500. A combination of the at least one processor 1111 and the at least one MEM 1112 may form processing means 1115 adapted to implement various embodiments of the present disclosure.

The apparatus 1120 includes at least one processor 1121, such as a DP, and at least one MEM 1122 coupled to the processor 1121. The apparatus 1120 may further include a suitable TX/RX 1123 coupled to the processor 1121. The MEM 1122 may be non-transitory machine readable storage medium and it may store a PROG 1124. The PROG 1124 may include instructions that, when executed on the associated processor 1121, enable the apparatus 1120 to operate in accordance with the embodiments of the present disclosure, for example to perform the method 700. A combination of the at least one processor 1121 and the at least one MEM 1122 may form processing means 1125 adapted to implement various embodiments of the present disclosure Various embodiments of the present disclosure may be implemented by computer program executable by one or more of the processors 1111 and 1121, software, firmware, hardware or in a combination thereof.

The MEMs 1112 and 1122 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless system operating in an unlicensed band, it should not be construed as limiting the spirit and scope of the present disclosure. The principle and concept of the present disclosure may be more generally applicable to other wireless systems.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a network device, comprising:
   determining a first period and a first plurality of candidate transmission opportunities within the first period, for transmitting a first control signal through a wireless channel;
   selecting a candidate transmission opportunity from the first plurality of candidate transmission opportunities within the first period based on detecting, through listen-before-talk (LBT), that the wireless channel is available for the candidate transmission opportunity;
   transmitting the first control signal through the wireless channel to a terminal device using the selected candidate transmission opportunity;
   determining a second period and a second plurality of candidate transmission opportunities within the second period for transmitting a second control signal through the wireless channel;
   selecting a further candidate transmission opportunity from the second plurality of candidate transmission opportunities within the second period, wherein selecting the further candidate transmission opportunity is based on the selected candidate transmission opportunity for the first control signal; and
   transmitting the second control signal through the wireless channel to the terminal device using the selected further candidate transmission opportunity.

2. The method according to claim 1, wherein the first plurality of candidate transmission opportunities are determined by one of:
   a transmission time window, which indicates a time interval for a plurality of transmissions of the first control signal, and
   a plurality of time positions, each of the plurality of time positions indicating a time position for starting a transmission of the first control signal.

3. The method according to claim 1, wherein said determining the first period and the first plurality of candidate transmission opportunities comprises determining the first period and the first plurality of candidate transmission opportunities based on at least one of:
   a predefined configuration for the first period and the first plurality of candidate transmission opportunities,
   a type and/or content of the first control signal,
   a status of the wireless channel, and
   a quality of service (QoS) requirement of the terminal device.

4. The method according to claim 1, further comprising:
   incorporating an indication into the first control signal before the transmitting, for indicating a time offset of the selected candidate transmission opportunity within the first period.

5. The method according to claim 4, wherein said incorporating the indication into the first control signal comprises at least one of:
   including the indication as a part of a payload of the first control signal; and
   selecting a transmission configuration from a first set of transmission configurations based on the selected candidate transmission opportunity, wherein each transmission configuration of the first set of transmission configurations is mapped to a candidate transmission opportunity of the first plurality of candidate transmission opportunities.

6. The method according to claim 1, wherein the detecting availability of the wireless channel before transmitting the first control signal comprises:
   starting the detection before the first candidate transmission opportunity of the first plurality of candidate transmission opportunities.

7. The method according to claim 6, wherein a time period from starting the detection to the first candidate transmission opportunity depends on a probability of the wireless channel being detected as available.

8. A method implemented at a terminal device, comprising:
   determining a first period and a first plurality of candidate transmission opportunities within the first period, for receiving a first control signal through a wireless channel;
   detecting the first control signal from a network device within the first period according to the determination;
   obtaining an indication from the detected first control signal, the indication indicating a time offset of the detected first control signal within the first period, wherein the time offset is relative to a starting point or end point of a transmission window within the first period;
   determining a second period and a second plurality of candidate transmission opportunities within the second period, for receiving a second control signal through a wireless channel based on the first control signal; and detecting the second control signal from the network device within the second period according to the determination.

9. The method according to claim 8, wherein the first plurality of candidate transmission opportunities are determined by one of:
a transmission time window, which indicates a time interval for a plurality of transmissions of the first control signal, and
a plurality of time positions, each of the plurality of time positions indicating a start time position for transmission of the first control signal.

10. The method according to claim 8, further comprising: synchronizing with the network device at least partly based on the obtained indication.

11. The method according to claim 8, wherein said obtaining an indication from the detected first control signal comprises at least one of:
extracting the indication from a payload of the first control signal, and
obtaining the indication based on a transmission configuration of the detected first control signal.

12. A network device, comprising:
a processor and a non-transitory machine-readable storage medium, the non-transitory machine-readable storage medium containing instructions that, when executed on the, cause the network device to:
determine a first period and a first plurality of candidate transmission opportunities within the first period, for transmitting a first control signal through a wireless channel,
select a candidate transmission opportunity from the first plurality of candidate transmission opportunities within the first period based on detecting, through listen-before-talk (LBT), that the wireless channel is available for the candidate transmission opportunity,
transmit the first control signal through the wireless channel to a terminal device using the selected candidate transmission opportunity,
determine a second period and a second plurality of candidate transmission opportunities within the second period for transmitting a second control signal through the wireless channel,
select a further candidate transmission opportunity from the second plurality of candidate transmission opportunities within the second period, wherein selecting the further candidate transmission opportunity is based on the selected candidate transmission opportunity for the first control signal, and
transmit the second control signal through the wireless channel to the terminal device using the selected further candidate transmission opportunity.

13. The network device according to claim 12, wherein the first plurality of candidate transmission opportunities are determined by one of:
a transmission time window, which indicates a time interval for a plurality of transmissions of the first control signal, and
a plurality of time positions, each of the plurality of time positions indicating a start time position for transmission of the first control signal.

14. The network device according to claim 12, wherein the network device is further to determine the first period and the first plurality of candidate transmission opportunities based on at least one of:
a predefined configuration for the first period and the first plurality of candidate transmission opportunities,
a type and/or content of the first control signal,
a status of the wireless channel, and
a quality of service (QoS) requirement of the terminal device.

15. The network device according to claim 12, wherein the network device is further to:
incorporate an indication into the first control signal for indicating a time offset of the selected candidate transmission opportunity within the first period.

16. The network device according to claim 15, wherein the incorporation of the indication into the first control signal includes at least one of:
including the indication as a part of a payload of the first control signal; and
selecting a transmission configuration from a first set of transmission configurations based on the selected candidate transmission opportunity, wherein each transmission configuration of the first set of transmission configurations is mapped to a candidate transmission opportunity of the first plurality of candidate transmission opportunities.

17. The network device according to claim 12, wherein the network device is further to start the detection before the first candidate transmission opportunity of the plurality of candidate transmission opportunities.

18. The network device according to claim 17, wherein a time period from starting the detection to the first candidate transmission opportunity depends on a probability of the wireless channel being detected as available.

19. The network device according to claim 12, wherein each the first and second control signals comprises one of an access information table (AIT), a signature sequence index (SSI), and a paging signal.

20. A terminal device, comprising:
a processor and a non-transitory machine-readable storage medium, the non-transitory machine-readable storage medium containing instructions that, when executed on the, cause the terminal device to:
determine a first period and a first plurality of candidate transmission opportunities within the first period, for receiving a first control signal through a wireless channel,
detect the first control signal from a network device within the first period according to the determination,
obtain an indication from the detected first control signal, the indication indicating a time offset of the detected first control signal within the first period wherein the time offset is relative to a starting point or end point of a transmission window within the first period,
determine a second period and a second plurality of candidate transmission opportunities within the second period, for receiving a second control signal through a wireless channel based on the first control signal, and
detect the second control signal from the network device within the second period according to the determination.

21. The terminal device according to claim 20, wherein the first plurality of candidate transmission opportunities are determined by one of:
a transmission time window, which indicates a time interval for a plurality of transmissions of the first control signal; and a plurality of time positions, each of the plurality of time positions indicating a start time position for transmission of the first control signal.

22. The terminal device according to claim 20, wherein the terminal device is further to:
synchronize with the network device at least partly based on the obtained indication.

23. The terminal device according to claim 20, wherein the indication is to be obtained by at least one of:
extracting the indication from a payload of the first control signal, and
obtaining the indication based on a transmission configuration of the detected first control signal, wherein the transmission configuration is mapped to a candidate transmission opportunity of the first plurality of candidate transmission opportunities.

24. The terminal device according to claim 20, wherein each the first and second control signals comprises one of an access information table (AIT), a signature sequence index (SSI), and a paging signal.

* * * * *

UNITED STATES PATENT AND TRADEMARK OFFICE
CERTIFICATE OF CORRECTION

PATENT NO. : 10,225,823 B2
APPLICATION NO. : 15/037265
DATED : March 5, 2019
INVENTOR(S) : Li et al.

Page 1 of 1

It is certified that error appears in the above-identified patent and that said Letters Patent is hereby corrected as shown below:

In the Drawings

In Fig. 7b, Sheet 5 of 8, delete Tag "7630" and insert Tag -- 730 --, therefor.

In the Specification

In Column 4, Lines 5-6, delete "according the" and insert -- according to the --, therefor.

In Column 4, Line 11, delete "according the" and insert -- according to the --, therefor.

In Column 4, Line 53, delete "FIG. 6a-6d" and insert -- FIGS. 6a-6d --, therefor.

In Column 8, Line 28, delete "ATI" and insert -- AIT --, therefor.

In Column 9, Line 14, delete "may starts" and insert -- may start --, therefor.

In Column 11, Lines 12-13, delete "FIG. 6a-6d." and insert -- FIGS. 6a-6d. --, therefor.

In Column 13, Line 30, delete "FIG. 6b-6c." and insert -- FIGS. 6b-6c. --, therefor.

In Column 22, Line 7, delete "disclosure" and insert -- disclosure. --, therefor.

In the Claims

In Column 26, Line 50, in Claim 20, delete "period" and insert -- period, --, therefor.

Signed and Sealed this
Eighteenth Day of June, 2019

Andrei Iancu
*Director of the United States Patent and Trademark Office*